United States Patent [19]

Liu et al.

[11] Patent Number: 4,589,214

[45] Date of Patent: May 20, 1986

[54] TAPER MICROMETER

[75] Inventors: Yih H. Liu; Jiin Y. Hour, both of Kao Hsiung, Taiwan

[73] Assignees: Ming-Sheng Juan, Kao Hsiung; Ching-Fu Tsai, Hsien, both of Taiwan

[21] Appl. No.: 595,452

[22] Filed: Mar. 30, 1984

[51] Int. Cl.⁴ ............................................. G01B 5/24
[52] U.S. Cl. .................................................. 33/531
[58] Field of Search .............. 33/174 E, 173, 167, 33/531, 532

[56] References Cited

U.S. PATENT DOCUMENTS

| 2,405,648 | 8/1946 | Gray | 33/174 E |
| 2,544,469 | 3/1951 | Olson | 33/174 E |
| 2,788,582 | 4/1957 | Middeler | 33/531 X |

FOREIGN PATENT DOCUMENTS

| 1313967 | 11/1962 | France | 33/174 E |
| 856502 | 12/1960 | United Kingdom | 33/174 E |

Primary Examiner—Harry N. Haroian
Attorney, Agent, or Firm—Holman & Stern

[57] ABSTRACT

A taper micrometer includes a straight piece having two datum pieces for contacting a surface of a cone to establish a base line perpendicular to and passing the axis of the cone and coincident with a longitudinal axis of the straight piece, a higher contacting piece, a lower contacting piece, a higher contacting piece transporter in carrying the higher contacting piece a longitudinal groove of the straight piece and capable of movement along the longitudinal axis to contact a first point on the surface and a measuring device capable of moving the lower contacting piece along the groove to contact a second point on the surface for indicating a value which is two times the distance between the two points along the direction of the base line divided by the distance between the two points along the direction of the axis of the cone so that the value directly represents the taper of the cone.

6 Claims, 8 Drawing Figures

TAPER MICROMETER

BACKGROUND OF THE INVENTION

The present invention relates to a taper micrometer, and more particularly to a taper micrometer capable of directly and accurately measuring the taper of a tapered surface.

It is known that the taper on the internal surface of a cone can only be measured indirectly and the measuring methods usually used are as follows:

(1) A sine bar of a sine plate is used and by the provision of various kinds of dial gauges one can read the taper.

(2) In mechanical manufacturing plant, a number of standard taper gauges are selected to match with the internal surface of the cone one by one to approximately estimate the taper.

It is well-known that the above two methods of measuring are costly and can not read the taper entirely accurately.

Recently, an American named Mr. George L. Gershman invented a taper micrometer capable of measuring the taper more easier and more accurately, and which is known as taper-mike, manufactured by the Taper Micrometer Corporation in America and widely used around the world.

As shown in FIGS. 1A and 1B, a taper-mike (shown in FIG. 1B) contrasts a sine bar measuring device (shown in FIG. 1A) in structure. As can be seen from FIGS. 1A and 1B, a micrometer head, which is capable of longitudinal translation, of the taper-mike replaces the gage block in the sine bar measuring device.

In FIG. 1C, there is shown a taper micrometer used for measuring the taper of the internal surface of a cone also manufactured by the Taper Micrometer Corporation in America. It can reasonably be pointed out that as to whether both measuring pieces C1, C2 are coplanar with the axis of the cone of which the taper of the internal surface is to be measured can only be conjectured by the condition of measuring pieces C1, C2 contacting the internal surface of the cone. Further, the value read from the taper micrometer is equivalent to the height of the gauge block in a sine bar measuring device and must be transformed through some calculations to obtain the taper. As can be referred to in FIG. 1D, the calculating formulas are as follows:

$$t = 2a/c \text{ (the definition)} \quad (1)$$

$$h = 4t^*b/(4+t^*t) \quad (2)$$

$$t = 2(b - \text{root}(b^*b - h^*h))/h \quad (3)$$

$$\theta = \arcsin h/b \quad (4)$$

$$t = 2 \tan \theta \quad (5)$$

where:
t: the taper
c: the length of the cone being measured
2a: the diameter difference of two circles passing two points on the cone being measured
h: the height of the gauge block
$\theta$: the angle enclosed by the cone surface and the cone axis
b: the length of the sine bar Thus, the calculation for obtaining the taper of a cone is time-consuming.

Applicant has therefore attempted to obviate the above disadvantages encountered by the widely used taper micrometer and the prior art.

SUMMARY OF THE INVENTION

It is an object of the present invention to provide a taper micrometer capable of accurate measurement by defining a straight line, on which the taper is to be measured on a cone surface, coplanar with the axis of the cone.

It is another object of the present invention to provide a taper micrometer capable of directly reading the taper of a tapered surface.

According to the present invention, a taper micrometer includes a centering means adapted to be brought in contact with a tapered surface for establishing a base line perpendicular to the axis of a cone whose surface contains a straight line defined between two points on the tapered surface between which points the taper is to be measured wherein the base line, the axis and the straight line are coplanar; and a measuring means for determining distances between the two points both on the direction of the axis and in the direction of the base line and using said distances for indicating the taper between the two points.

The centering means can includes a straight piece having a longitudinal axis for being set perpendicular to the axis of the cone; and two datum pieces symmetrically provided on opposite sides of the straight piece and capable of contacting the tapered surface so that when the two datum pieces contact the tapered surface the longitudinal axis of the straight piece is coincident with the base line.

The measuring means can include a higher contacting piece provided in a longitudinal groove which is provided on the straight piece between the two datum pieces and at one side of the datum pieces and capable of sliding along the longitudinal axis and within the longitudinal groove to contact the tapered surface at a first of the two points, a lower contacting piece provided in the longitudinal groove and at the other side of the datum pieces and capable of sliding along the longitudinal axis and within the longitudinal groove to contact the tapered surface on a second of the two points and a measuring device cooperating with the contacting pieces and for determining a value which is two times the distance between the two points along the direction of the base line divided by the distance between the two points along the direction of the axis of the cone so that wherever the contacting pieces are slid within the longitudinal groove, since the two points contacted respectively by the two contacting pieces have a fixed distance along the direction of the axis of the cone, due to the respective heights of the contacting pieces, and the value read is the taper desired.

In one embodiment, the straight piece can further include two longitudinal channels respectively provided on the two sides thereof. The higher contacting piece can have a hole near its bottom end opposite to the end for contacting the tapered surface, the hole having an axis right below and substantially parallel to the longitudinal axis. The measuring means can further include a higher contacting piece transporter having two corresponding longitudinal webs capable respectively of sliding in the longitudinal channels and a central groove capable of passing and fixing thereon the higher contacting piece, a spindle coaxially secured on the hole and a sleeve to which the lower contacting piece is attached, on which the measuring device is provided and being capable of sliding along the spindle so that when the contacting pieces are slid to contact the two points by respectively translating the higher contacting piece transporter along the longitudinal indentations and sliding the sleeve along the spindle, the measuring device will indicate the taper.

Preferably the measuring means further includes a barrel inserted upon the sleeve from one end of the spindle opposite to the end secured in the hole and rotatably as well as threadedly engaged with the sleeve, a longitudinal reading provided on the sleeve and a circular reading provided on the opening end of the barrel in order to cooperate with the longitudinal reading for permitting a fractional reading so that when the higher contacting piece contacts the tapered surface and the barrel is rotated to set the lower contacting piece in contact with the tapered surface the fractional reading represents the taper.

The measuring device may include a digital display which is responsive to the translation of the sleeve along the spindle so that the taper can be read from the digital display directly.

The present invention may best be understood with reference to the accompanying drawings.

DETAILED DESCRIPTION OF THE PREFERRED EMBODIMENT

Figure 1A:
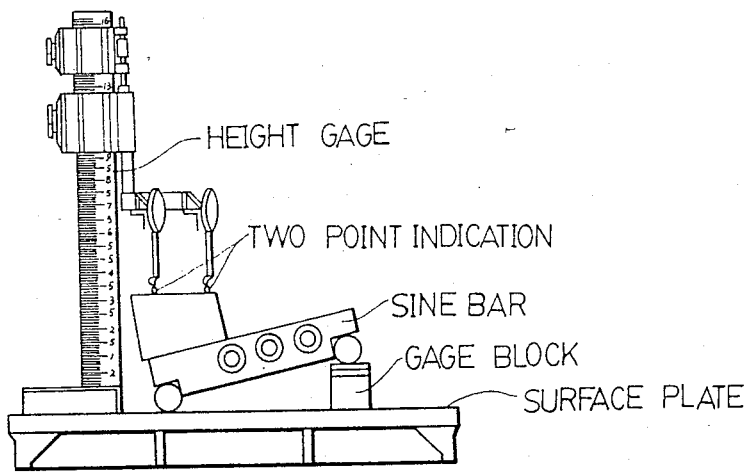
FIG. 1 is a schematical view showing a sine bar measuring device for taper measuring.
FIG. 1B is a schematical view showing a taper-mike for taper measuring.
FIG. 1C is a schematical view showing a known taper micrometer for measuring the taper of a tapered bore.
FIG. 1D is a diagram for illustrating the related taper calculating formulas for the prior art.
Figure 1B:
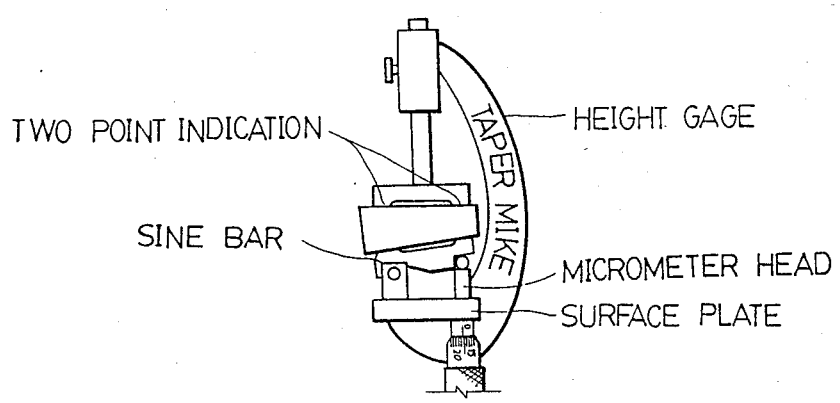
Figure 1C:
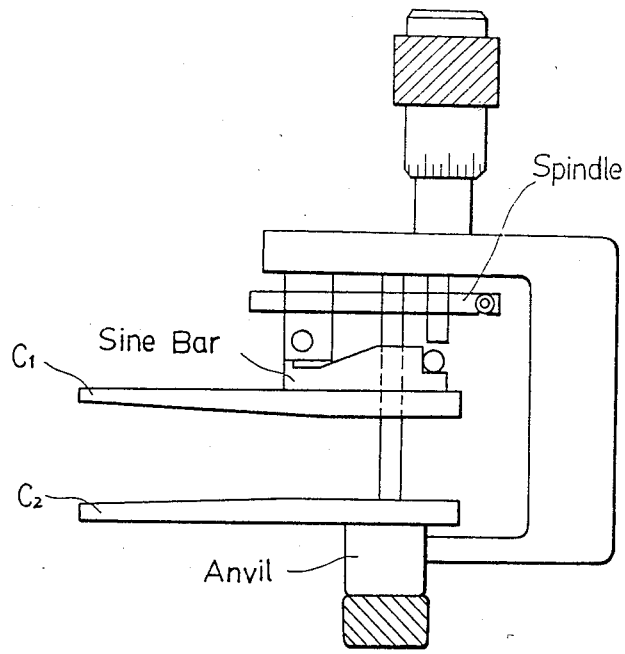
Figure 1D:
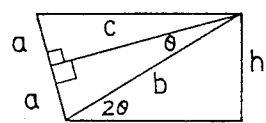
Figure 2:
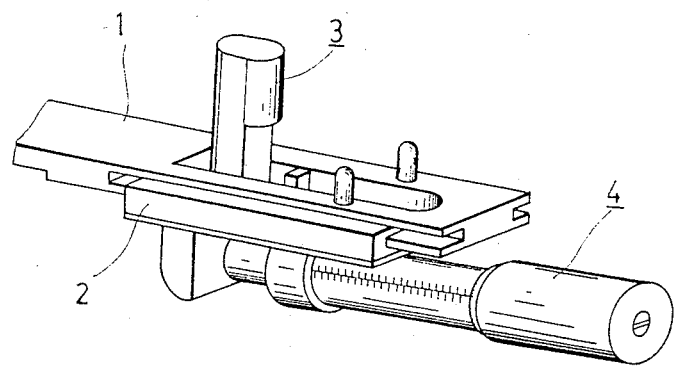
FIG. 2 is a perspective view showing a preferred embodiment of a taper micrometer of the present invention.
Figure 3:
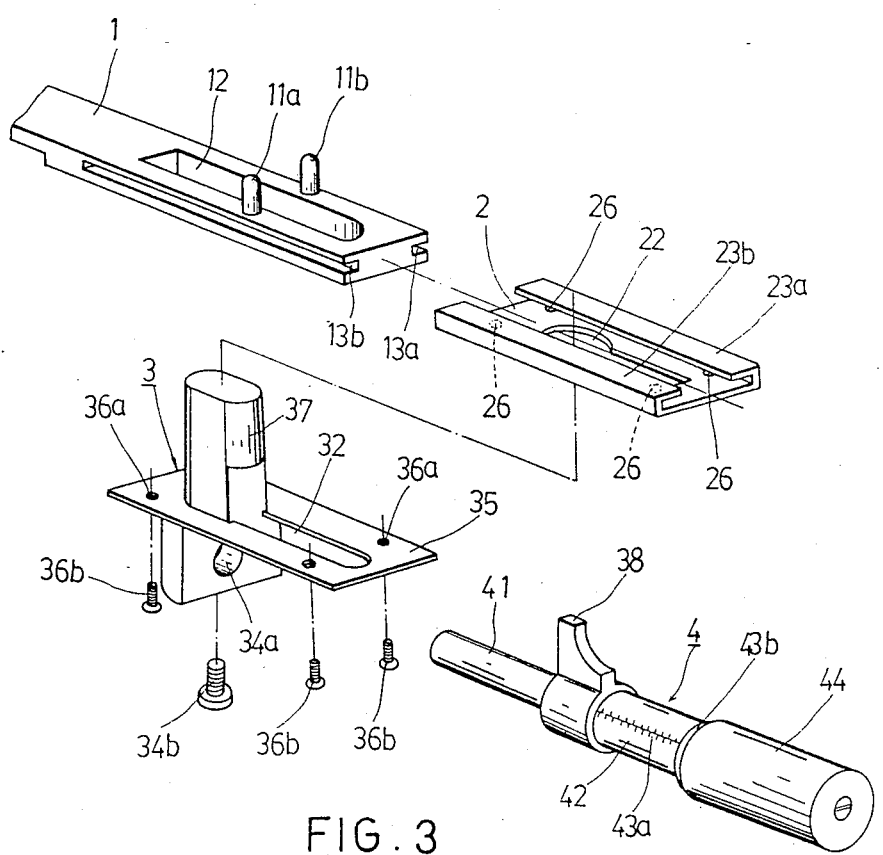
FIG. 3 is an exploded perspective view showing the preferred embodiment of the present invention.

Generally speaking, as shown in FIG. 2, the present taper micrometer includes a centering means having a straight piece 1, and a measuring means having a higher contacting piece transporter 2, a contacting device 3 and a measuring device 4. Referring now to FIG. 3, the centering means further includes two datum pieces 11a, 11b symmetrically provided on opposite sides of straight piece 1, which is provided with a longitudinal groove 12 between datum pieces 11a, 11b and two longitudinal channels 13a, 13b on its two sides. Contacting device 3 further includes a lower contacting piece 38, a higher contacting piece 37, a plate 35 for mounting and securing higher contacting piece 37 thereon, and having four threaded holes 36a and a central groove 32, a hole 34a provided near the bottom end of higher contacting piece 37 and having an axis right below and parallel to the longitudinal axes of central groove 32 and straight piece 1, a first screw 34b and four second screws 36b. Higher contacting piece transporter 2 further includes a central groove 22, two longitudinal webs 23a, 23b capable of engaging and sliding in longitudinal channels 13a, 13b respectively and four threaded holes 26 into which, through threaded holes 36a, the four screws 36b screw. Measuring device 4 further includes a spindle 41 coaxially inserted into hole 34a and secured on hole 34a by screw 34b, a sleeve 42 to which lower contacting piece 38 is attached and capable of sliding on spindle 41, a barrel 44 inserted upon sleeve 42 and rotatably as well as threadedly engaged with sleeve 42 and a longitudinal reading scale 43a on sleeve 42 together with a circular reading scale 43b on the end of barrel 43b for permitting a fractional reading which can be obtained by the cooperation of longitudinal scale 43a and circular scale 43b as is well known in the related art.

From the structural description of the present taper micrometer hereinbefore, the following facts can be derived:

First, since datum pieces 11a, 11b are symmetrically provided on the opposite sides of straight piece 1, the longitudinal axis of straight piece 1 is vertical to the axis of a cone whose surface contains a straight line defined between two points on a tapered surface between which a taper is to be measured, when both datum pieces 11a, 11b contact the tapered surface.

Second, contacting pieces 37, 38 are capable of being moved along the longitudinal axis of straight piece 1, sliding within longitudinal groove 12 and central grooves 32, 22 respectively and contacting the two points on the tapered surface so that the scales 43a, 43b can be designed to indicate a value which is two times the distance between the two points along the direction of the longitudinal axis divided by the distance between the two points along the direction of the axis of the cone. This is because whenever contacting pieces 37, 38 are moved respectively by sliding transporter 2 along longitudinal grooves 13a, 13b, and by rotating barrel 44, so as to both contact the tapered surface, the height difference, i.e. distance c in FIG. 4, between the two pieces 37, 38 is fixed by their respective heights.

Third, the present taper micrometer can be used to measure the taper of the internal surface of a cone or the external surface of the cone or just the taper of an inclined surface.

Figure 4:
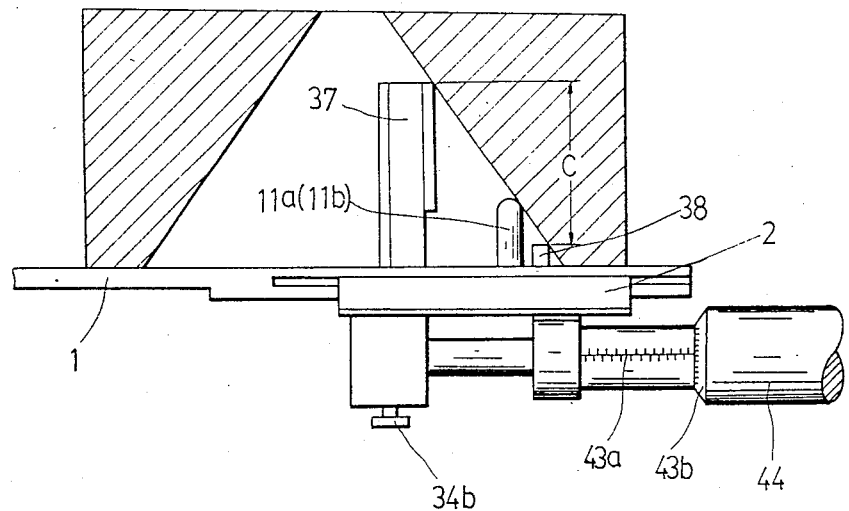
FIG. 4 is a schematic view showing the preferred embodiment of the present invention in measuring the taper of a tapered bore.
Figure 5:
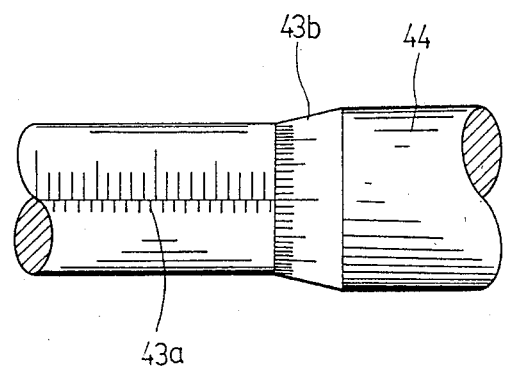
FIG. 5 is a perspective view showing the readings on the sleeve and the barrel of the preferred embodiment of the present invention.

In FIG. 4, there is shown the present taper micrometer in measuring the taper of a tapered bore. FIG. 5 shows an example of readings on scales 43a, 43b.

In practice, if 0.01 mm accuracy of the measuring device is used and 20 mm height difference of the two contacting pieces 37, 38 is set, then, the taper accuracy of the present micrometer is $t = 2a/c = 2*(0.01)/20 = 0.001$ which is equivalent to ISO (International Organization for Standardization) 10T magnitude. If desired, a lower ISO magnitude, e.g. 3T or 4T can be achieved by the present invention. The taper ($t = 2a/c$) range of the present micrometer can be from about 0.001 to 2.5 which is suitable for various kinds of taper standards such as Morse Taper, Brown & Sharp Taper, Jano Taper . . . etc.

While the present invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What we claim is:

1. A taper micrometer comprising:
   a centering means for contacting a tapered surface and establishing a base line perpendicular to the axis of a cone having a surface containing a straight line defined between two points on said tapered surface between which a taper is to be measured, said base line, said axis and said straight line being coplanar; and
   a measuring means for determining distances between said points both in the direction of said axis and the direction of said base line and using the distances for indicating said taper between said two points, wherein said centering means includes:
   a straight piece having a longitudinal axis for being set perpendicular to said axis of said cone; and
   two datum pieces symmetrically provided on opposite sides of the longitudinal axis of said straight piece and capable of contacting said tapered surface
   whereby when said two datum pieces contact said tapered surface said longitudinal axis is coincident with said base line.

2. A taper micrometer according to claim 1 wherein said straight piece is provided with a longitudinal groove between said two datum pieces; and said measuring means includes:
   a higher contacting piece in said longitudinal groove on one side of said datum pieces for sliding along said longitudinal axis within said longitudinal groove to contact said tapered surface at a first of said two points;
   a lower contacting piece in said longitudinal groove on the other side of said datum pieces and for sliding along said longitudinal axis within said longitudinal groove to contact said tapered surface at the other of said two points; and
   a measuring device cooperating with said contacting pieces for determining a value which is two times the distance between said two points along the direction of said base line divided by the distance between said two points along the direction of said axis of said cone wherever said contacting pieces are slid within said longitudinal groove, by virtue of said two points contacted respectively by said two contacting pieces having a fixed distance along said direction of said axis of said cone due to the respective heights of the contacting pieces above said straight piece.

3. A taper micrometer according to claim 2 wherein said straight piece further includes two longitudinal channels respectively provided on two edges thereof;
   said higher contacting piece has a hole near its bottom end opposite to an end for contacting said tapered surface, said hole having an axis below and substantially parallel to said longitudinal axis; and said measuring means further includes:
   a higher contacting piece transporter having two longitudinal webs capable of sliding on said longitudinal channels and a central groove receiving said higher contacting piece.

4. A taper micrometer according to claim 3 wherein said measuring means further includes:
   a barrel inserted upon said sleeve from one end of said spindle opposite to the end secured in said hole and rotatably as well as threadedly engaged with said sleeve; a longitudinal scale provided on said sleeve; and
   a circular scale provided on the opening end of said barrel in order to cooperate with said longitudinal scale for permitting a fractional reading whereby when said higher contacting piece contacts said tapered surface and said barrel is rotated to set said lower contacting piece in contact with said tapered surface said fractional reading represents said taper.

5. A taper micrometer comprising an elongate flat piece for engaging against the base of an element having an inclined surface extending from the base whose taper is to be measured, a pair of datum pieces fixed to and extending upwardly from the flat piece on opposite sides of a longitudinal axis of the flat piece respectively for engagement against the inclined surface, a first contacting piece extending upwardly from the flat piece to a level higher than the datum pieces, a second contacting piece extending upwardly from the flat piece to a level lower than the datum pieces, means for moving both contacting pieces lengthwise of the flat piece when the datum pieces engage the inclined surface as aforesaid so as to bring the respective contacting pieces into engagement with points on the surface on opposite sides of the datum pieces respectively, and measuring means for gauging the separation of the contacting pieces and relating the separation to the respective heights of the contacting pieces thereby indicating the taper of the surface.

6. The invention of claim 5 wherein the measuring means comprises micrometer scale means associated with the second contacting piece for measuring separation of the second contacting piece from the first contacting piece and relating same to the respective heights of the contacting pieces to indicate the taper of the surface.